United States Patent [19]
Hemphill

[11] Patent Number: 5,774,628
[45] Date of Patent: Jun. 30, 1998

[54] SPEAKER-INDEPENDENT DYNAMIC VOCABULARY AND GRAMMAR IN SPEECH RECOGNITION

[75] Inventor: Charles T. Hemphill, Allen, Tex.

[73] Assignee: Texas Instruments Incorporated, Dallas, Tex.

[21] Appl. No.: 419,226

[22] Filed: Apr. 10, 1995

[51] Int. Cl.$^6$ ........................................................ G01L 5/00
[52] U.S. Cl. ........................ 395/2.64; 395/2.65; 395/2.52
[58] Field of Search ................................. 395/2.64, 2.65, 395/2.66, 2.54, 2.52, 2.6

[56] References Cited

U.S. PATENT DOCUMENTS 4,156,868   5/1979   Levinson .............................. 340/146.3
5,509,104   4/1996   Lee et al. ................................ 395/2.64

OTHER PUBLICATIONS

Schmandt et al., ("Augmenting a Window System With Speech Input", Computer Magazine, Aug. 1990, vol. 23, Issue 8, pp. 50–56.

*Primary Examiner*—Fan S. Tsang
*Attorney, Agent, or Firm*—Robert L. Troike; Wade James Brady, III; Richard L. Donaldson

[57] ABSTRACT

This is an automated speech recognition system, the system comprising: an input device for receiving voice signals; a means for computing the voice signals into stochastic RGDAGs and individual grammars; a search engine that directly processes the stochastic RGDAGs; a means for adding the individual grammars within the RGDAG; a means for replacing the individual grammars within the RGDAG; and a means for deleting the individual grammars within the RGDAG. The system can include a means for adding modified grammars within RGDAGs; a means for linking a terminal symbol from a first grammar to a start symbol in a second grammar; a means for finding a maximum depth of each symbol in the RGDAG; a means for determining if the system requires parse information for the grammar by looking for ancestor symbols; a means for specifing a plurality of RGs within the RGDAGs as starting points for the search engine; and a means for returning a parse through each of a plurality of RGs in the RGDAGs for a recognized utterance. Other devices, systems and methods are also disclosed.

20 Claims, 3 Drawing Sheets

SPEAKER-INDEPENDENT DYNAMIC VOCABULARY AND GRAMMAR IN SPEECH RECOGNITION

CROSS-REFERENCE TO RELATED APPLICATIONS

The following coassigned patent applications are hereby incorporated herein by reference:

| Ser. No. | Filing Date | TI Case No. |
|---|---|---|
| 08/419,229 | 04/10/95 | TI-20205 |

FIELD OF THE INVENTION

This invention generally relates to speaker-independent dynamic vocabulary and grammar in speech recognition.

BACKGROUND OF THE INVENTION

Without limiting the scope of the invention, its background is described in connection with speaker-independent dynamic vocabulary and grammar in speech recognition.

Current recognition systems fall into two basic classes: speaker dependent and independent. Speaker dependent systems don't typically worry about pronunciations. If the system encounters a new word, the user simply trains it. The set of words or phrases may change over time, but the recognizer merely treats the set as a list. This results in a very strict system where training quickly becomes tiresome. Current speaker independent systems avoid the problem by assuming a static vocabulary and grammar.

SUMMARY OF THE INVENTION

This invention includes the following important/novel features: it creates phonetic pronunciations on the fly, including alternate pronunciations for speaker independence; it supports a rich grammar structure possible that allows alternative/optional syntactic structure; and grammar replacement requires minimal change in the RGDAG structure.

To allow anyone to walk up and use a computer system naturally without training, continuous, speaker independent speech recognition is used in the present invention. Additionally, the recognizer of the present invention uses phonetic models to allow recognition of any vocabulary word without training on that specific word. The ability to handle a flexible vocabulary, coupled with the ability to dynamically modify grammars in the recognized, allows us to support grammars particular to a specific application.

Current speaker-independent speech recognition systems assume a fixed vocabulary once invoked. However, some applications require both dynamic grammars and vocabulary. For example, a World Wide Web (heretofore termed as Web or WWW) interface such as Mosaic offers choices on the screen in the form of underlined phrases. The pages containing these phrases can come from anywhere in the world making static grammars and vocabularies for the phrases impossible. This patent describes a method for dynamically creating grammars and pronunciations for arbitrary vocabulary tokens and describes how to incorporate them into a running speaker-independent recognizer.

This is an automated speech recognition system, the system comprising: an input device for receiving voice signals; a means for computing the voice signals into stochastic RGDAGs and individual grammars; a search engine that directly processes the stochastic RGDAGs; a means for adding the individual grammars within the RGDAG; a means for replacing the individual grammars within the RGDAG; and a means for deleting the individual grammars within the RGDAG. The system can include a means for adding modified grammars within RGDAGs; a means for linking a terminal symbol from a first grammar to a start symbol in a second grammar; a means for finding a maximum depth of each symbol in the RGDAG; a means for determining if the system requires parse information for the grammar by looking for ancestor symbols; a means for specifying a plurality of RGs within the RGDAGs as striking points for the search engine; and a means for returning a parse through each of a plurality of RGs in the RGDAGs for a recognized utterance. Other devices, systems and methods are also disclosed.

BRIEF DESCRIPTION OF THE DRAWINGS

In the drawings.

Corresponding numerals and symbols In the different figures refer to corresponding parts unless otherwise indicated.

DETAILED DESCRIPTION OF PREFERRED EMBODIMENTS

As the popularity of the Web has skyrocketed over the past two years, so has the amount of information available. In addition, the nature of the users has shifted from scientists to the general public. At the same time, the power of workstations and PCs has increased to the point where they can support speaker independent, continuous speech recognition. The preferred embodiment will be described as a speech interface to the Web that allows easy access to information and as an integral part of intelligent user agents.

In the preferred embodiment, it is assumed that speech comes in locally from a microphone, but it could just as well come from a telephone. In addition, speech processing takes place locally on the client machine. This simplifies processing of local requests such as "scroll down", etc. However, there is nothing intrinsic in the architecture of the invention that would prevent speech processing on a server in a distributed environment. The description of the interface concentrates on speech input, but it does work with mouse and keyboard input as well.

Figure 1:
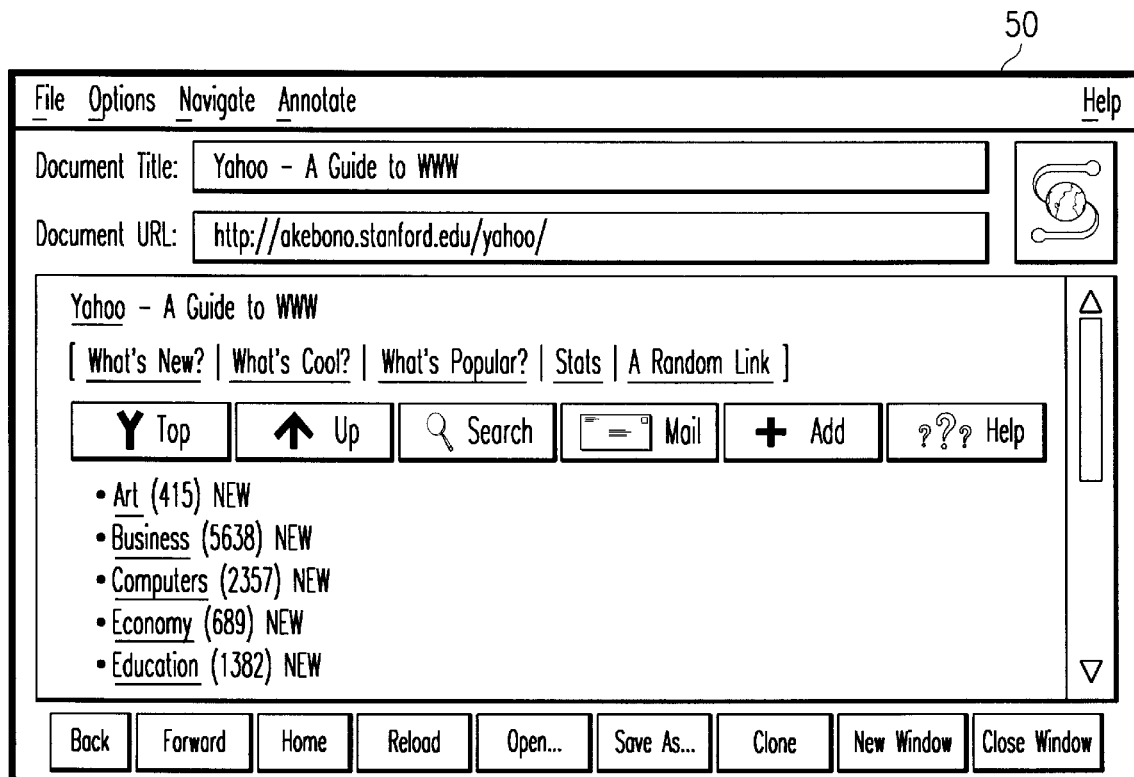
FIG. 1 is a flow diagram of the speech interface of the preferred embodiment.
Figure 1:
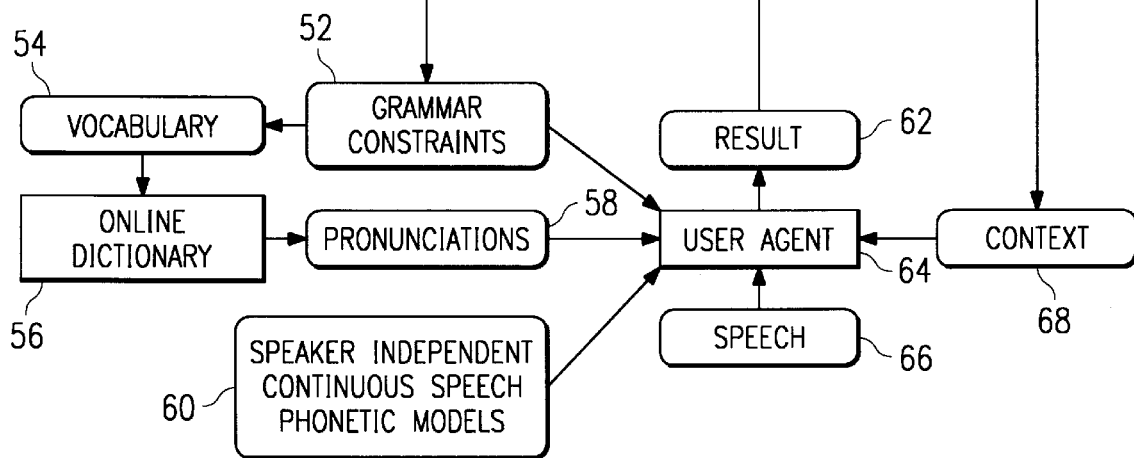

The preferred embodiment is described in the context of a World Wide Web interface using Mosaic. FIG. 1 illustrates a speech interface to Mosaic. The user can select underlined phrases with the mouse. However, in order to describe how FIG. 1 works, a few definitions follow:

A Regular Grammar (RG) (actually a right-linear grammar [J. E. Hopcroft and J. D. Ullman. Introduction to *Automata* Theory, Languages, and Computation, page 217. Addison-Wesley, 1979.]) is a 4-tuple G ($\Sigma$, N, S, P) where $\Sigma$ is a set of terminal symbols, N is a set of nonterminal symbols, S ∈ N is a distinguished start symbol, and
P is a set of productions of the form A→α or A→αB.
where A,B ∈ N, α ∈ Σ*, and Σ ∩ N=0.

A Directed Acyclic Graph of RGs (RGDAG) is a 2-tuple G=(S, $G_{RG}$) where $G_{RG}$ is a set of RGs and $G_{RGi}$=($\Sigma_i$, $N_i$, $S_i$, $P_i$), $1 \leq i \leq |G_{RG}|$, S is a distinguished start symbol, S ∈ {$S_i$, ... $S_{|GRG|}$}, the start symbols of the RGs axe disjoint: $S_i \neq S_j$, $1 \leq i < i \leq |G_{RG}|$, and there does not exist a cycle among the RGs, i.e, there does not exist a set of derivations $A_o \rightarrow \alpha_1 a_1, \beta_1, A_1 = \alpha_2 a_2 \beta_2, \ldots, A_n \rightarrow \alpha_{n+1} a_o \beta_{n+1}$, where $a_i = A_i, A_{i-1}, A_i \in \{S_1, \ldots, S_{|GRG|}\}$, $a_i \in \Sigma_i$, and $\alpha_i$, $\beta_i \in \Sigma_i^*$.

Without loss of generality, assume that the nonterminals symbols of the RGs are disjoint. Then we may form a restricted CFG, $G_{CFG}$=($\Sigma$, N, S, P), from the RGDAG where $\Sigma = \cup_{1 \geq i \geq |GRG|} \Sigma_i - \{S_1, \ldots, S_{|GRG|}\}$,
$N = \cup_{1 \geq i \geq |GRG|} N_i$
S is the same as the RGDAG,
$P = \cup_1 \geq i \geq |GRG| P_i$.

resulting grammar is not self-embedding, so the language recognized by this CFG is still a regular language [Hopcroft and Ullman, p. 229]. In addition, RGDAGs provide a rich substrate for language definition, yet prove simple enough to implement in a real-time recognition system. Furthermore, a stochastic RGDAG is an RGDAG with rule probabilities.

As depicted in FIG. 1, the Mosaic screen 50 has links to grammar constraints 52. Smart Page grammars and link grammars are examples of grammars that would feed the grammar constraints 52. The grammar constraints 52 in turn input into a vocabulary 54 and the user agent 64. (For the Mosaic interface, a user agent 64 that uses the recognition system was created via an Application Program Interface (API).) In turn, the vocabulary 54 feeds the online dictionary 56, which inputs into the pronunciations module 58. The pronunciations module 58, as well as the Speaker Independent Continuous Speech Phonetic Models module 60 input into the User Agent 64. In addition, the Speech module 66 would input the user's speech into the User Agent 64. In parallel, the Context module 68 gets inputs from the Mosaic screen 50 and inputs into the User Agent 64. The User Agent 64 would then take all those inputs, and formulate a result 62 to send as a command to the Mosaic screen 50.

Figure 2:
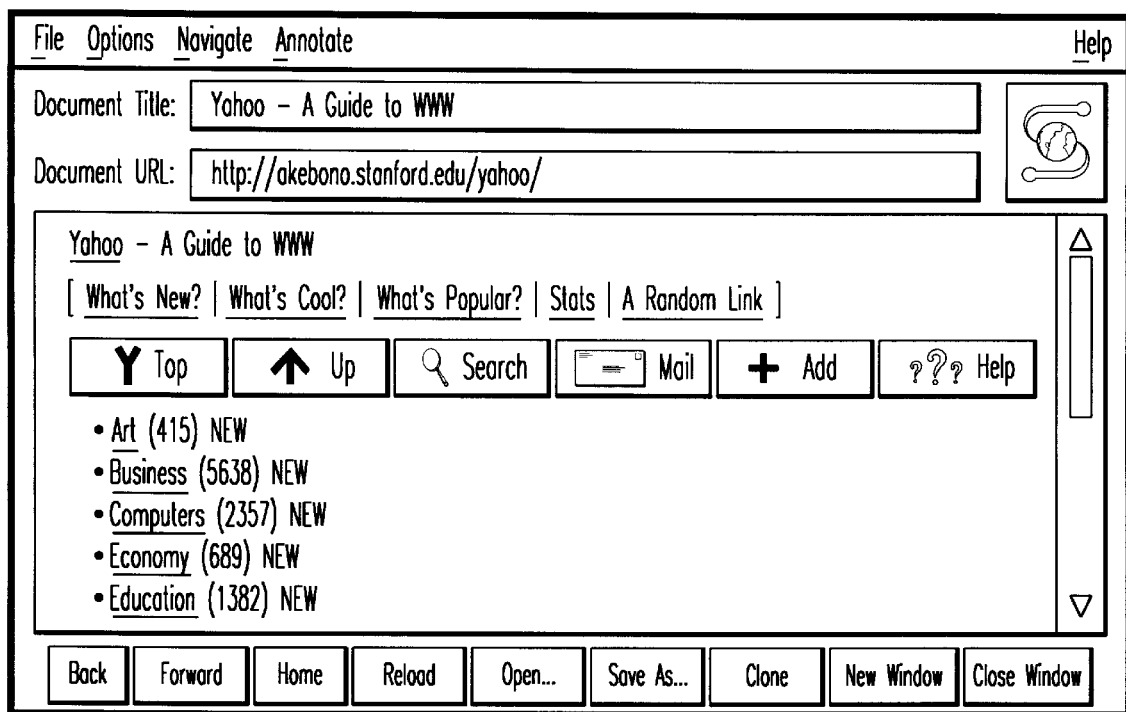
FIG. 2 is a flow diagram of augmenting an existing RGDAG to dynamically accommodate new syntax and vocabulary.
Figure 2:
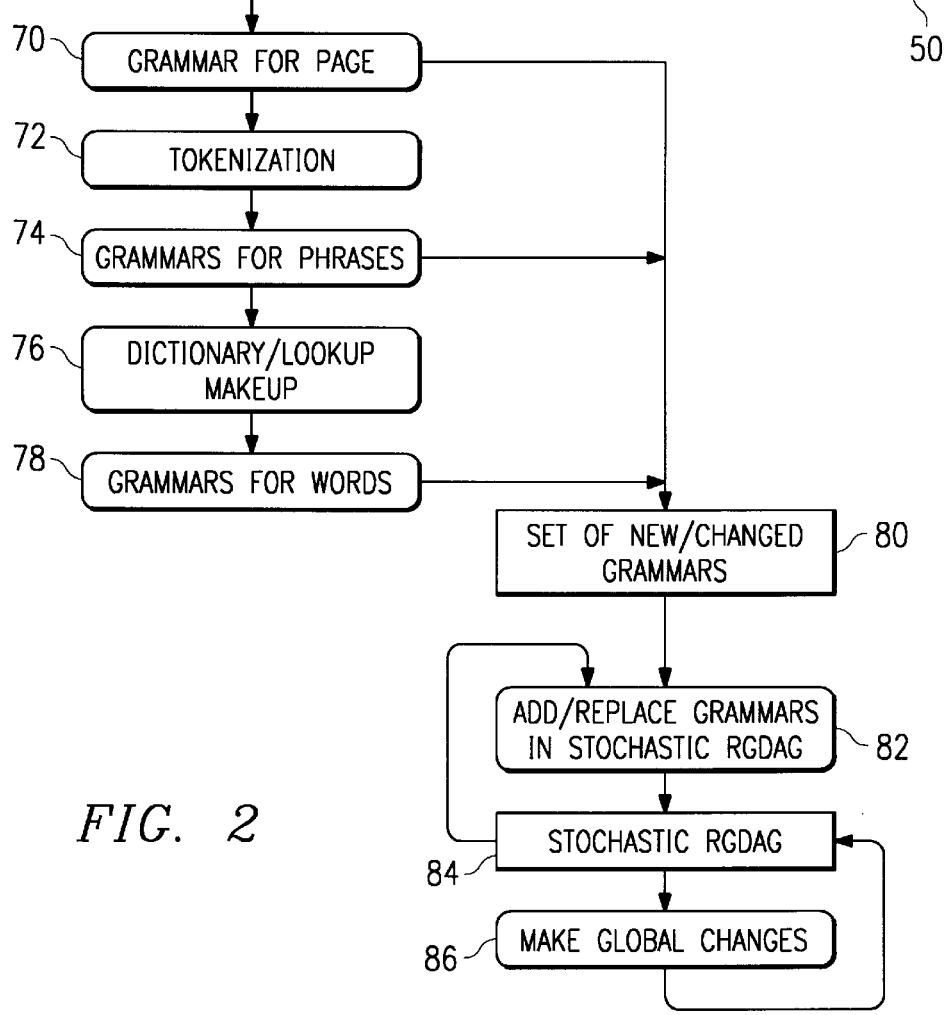

FIG. 2 illustrates the steps in augmenting an existing RGDAG to dynamically accommodate new syntax and vocabulary. As in FIG. 1, a user agent was created that uses the recognition system via an API. Every time the screen 50 changes, the user agent creates a grammar 70 containing the currently visible underlined phrases (links). However, other grammar structures are possible, and are to be understood as to be in the scope of the invention. From this grammar 70, the user agent tokenizes 72 the phrases to create phrase grammars 74 that can include, for example, optional letter spelling (e.g. "NIST" pronounced as a word or as the letters "N", "I", "S" and "T") and deleted/optional punctuation (e.g., optionally spoken "dot" in "csc.ti.com", and the question mark in "What's New?"). From the tokens, the user agent creates phonetic pronunciation grammars 76 using a combination of online dictionaries and a text-to-phoneme mapping. The user interface then adds/replaces all of the grammars created 78. This involves several simple bookkeeping operations for the recognizer, including identifying which symbols denote "words" to output.

Finally, global changes 86 are implemented to incorporate the new/changed grammars 80. For this, the grammars are connected in an RGDAG relationship 82, 84. In addition, the maximum depth for each symbol is computed. It is also determined if the recognizer requires parse information for this grammar by looking for ancestor symbols with output. Then, the structure of the grammar for efficient parsing is identified.

Figure 3:
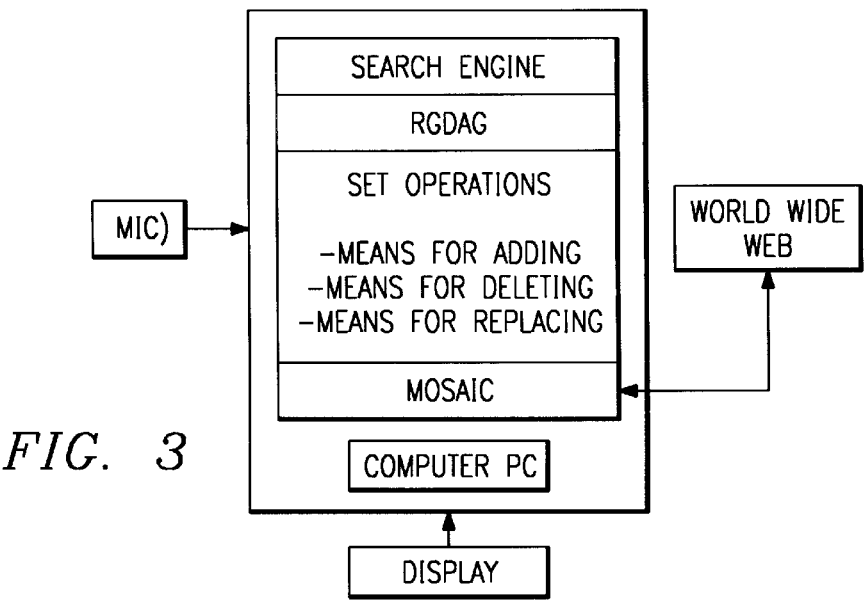
FIG. 3 is an overall diagram of the system.

FIG. 3 illustrates the PC workstation coupled to a display, the World Wide Web network and a microphone for input. The PC includes a processor, a search engine, browser (Mosaic), an RGDAG and a set operations such as means for adding, deleting and replacing. An example of a searching engine is in Hemphill, et al. U.S. Pat. No. 4,984,178.

An example of regular grammars (RG) as in Hoperoft et al. is in brackets as follows. (We do not show all grammar. This example for the sake of clarity.)

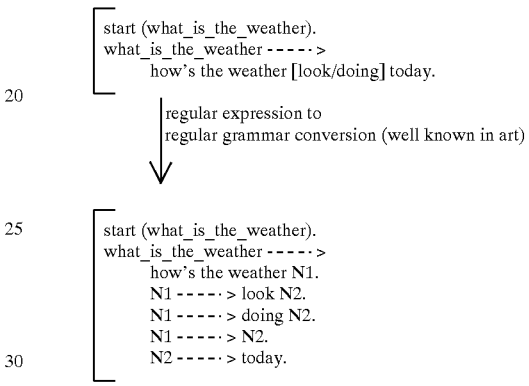

From pronunciation dictionary or text-to-pronunciation rules using ARPAbet phone symbols (well known art phonetic alphabet defined by ARPA or Advanced Research Projects Agency).

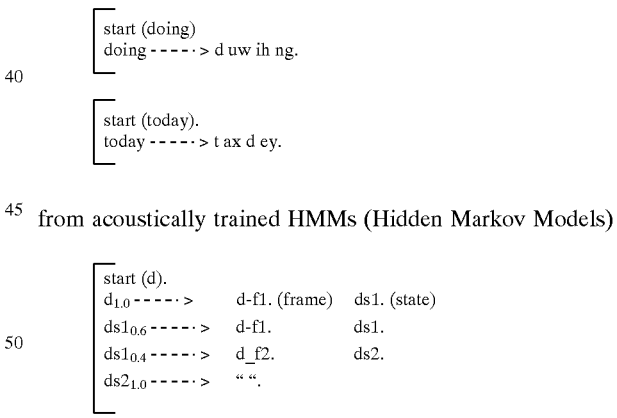

from acoustically trained HMMs (Hidden Markov Models)

```
start (d).
d_{1.0} -----> d-f1. (frame)   ds1. (state)
ds1_{0.6} -----> d-f1.         ds1.
ds1_{0.4} -----> d_f2.         ds2.
ds2_{1.0} -----> " ".
```

An example of an RGDAG which is for a set of regular grammars for the above examples is {G(what_is_the_weather), G(doing), G(today), G(d)}, where G(x) represents the grammar with start symbol x.

Figure 4:
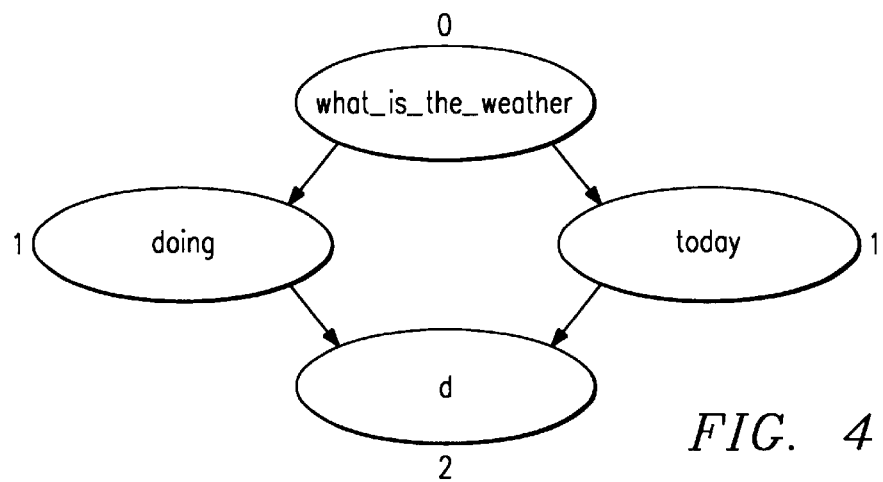
FIG. 4 illustrates RGDAG relationship.

The RGDAG relationship of this set of grammars is represented by the graph of FIG. 4. The numbers show the maximum based depth for each symbol in the graph.

We now provide an example of dynamic grammar modification. We only illustrate a subset of the grammar to simplify the example.

Figure 5:
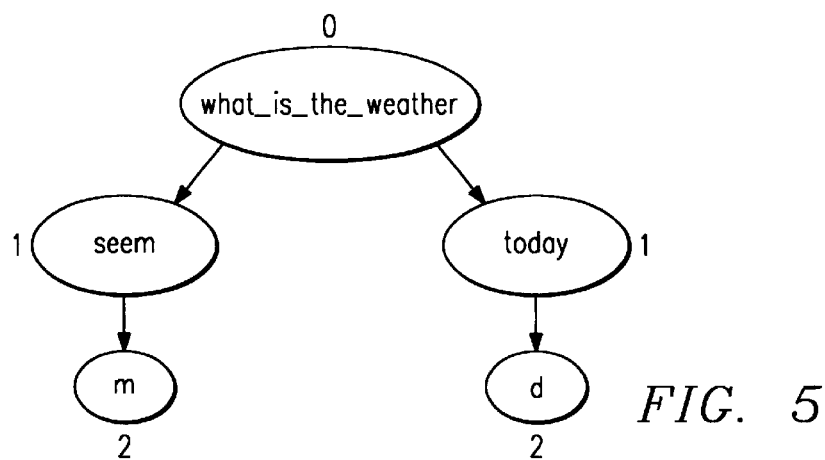
FIG. 5 illustrates a modified RGDAG relationship

The replacement of "what_is_the_weather," the adding of "seen" and deletion of "doing" is as follows and is represented in FIG. 5.

```
start (what_is_the_weather).
    what_is_the_weather ----->
        how's the weather seem today.

start (seem)
    seem -----> s iy m.

start (m)
    m1,0 -----> m-f1. (frame)    m_s1. (state)
    m_s10,2 -----> m-f1.          m_s1.
    m_s10,8 -----> m_f2.          m_s2.
    m_s21,0 -----> " ".

replace    G(what_is_the_weather)
    add        G(seem), G(m)
    delete     G(doing)
```

These are standard set operations (well known in art) on the sets in the definition. Replace is delete then add (as is well known).

```
now RGDAG is
{G(what_is_the_weather), G(today), G(d), G(seem), G(m)}
```

The RGDAG relationship of this set of grammars is represented by the graph of FIG. 5. The number shows the maximum depth for each symbol in the graph.

Even though the preferred embodiment was described in relation to a browser for the Web, it is to be understood that the invention encompasses any software or hardware application that implements a speaker independent dynamic vocabulary and grammar in speech recognition utilizing the above described process or its equivalent.

Furthermore, it is to be understood that the scope of the invention also comprehends embodiments different from those described, yet within the scope of the claims. For example, RGDAGs maybe replaced by equivalent systems such as a DAG of stochastic Finite State Automota. In addition, compilation of an RGDAG to a single RG may involve producing a single equivalent regular grammar. Furthermore, the RGDAG may have an arbitrary structure (the RGDAG is not limited to strict levels such as syntax and acoustics or syntax, pronunciation and acoustics, as may be found in some recognition systems.

Words of inclusion are to be interpreted as nonexhaustive in considering the scope of the invention. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An automated speech recognition system, said system comprising:
    a. an input device for receiving voice signals;
    b. a means for computing said voice signals into at least one stochastic RGDAG (Regular Grammars Directed Acyclic Graph) and individual grammars;
    c. a search engine that directly processes said stochastic RGDAG;
    d. a means for adding said individual grammars within said RGDAG;
    e. a means for replacing said individual grammars within said RGDAG; and
    f. a means for deleting said individual grammars within said RGDAG.

2. The system of claim 1, wherein said system further includes a means for adding modified grammars within an RGDAG.

3. The system of claim 1, wherein said system further includes a means for linking a terminal symbol from a first grammar to a start symbol in a second grammar.

4. The system of claim 1, wherein said system further includes a means for finding a maximum depth of each symbol in said RGDAG.

5. The system of claim 1, wherein said system further includes a means for determining if said system requires parse information for said individual grammars by looking for ancestor symbols.

6. The system of claim 1, wherein said system further includes a means for specifying a plurality of regular Grammars within said RGDAG as starting points for said search engine.

7. The system of claim 1, wherein said system further includes a means for returning a parse through each of a plurality of regular Grammars in said RGDAG for a recognized utterance.

8. A method of speech recognition providing speaker independence and dynamic vocabularies and grammars, said method comprising:
    a. inputting device for receiving voice signals;
    b. computing said voice signals into at least one stochastic RGDAG (Regular Grammars Directed Acyclic Graph) and individual grammars;
    c. directly searching said stochastic RGDAG;
    d. adding said individual grammars within said RGDAG;
    e. replacing said individual grammars within said RGDAG; and
    f. deleting said individual grammars within said RGDAG.

9. The method of claim 8, wherein said method further includes adding modified grammars within RGDAG.

10. The method of claim 8, wherein said method further includes linking a terminal symbol from a first grammar to a start symbol in a second grammar.

11. The method of claim 8, wherein said method further includes finding a maximum depth of each symbol in said RGDAG.

12. The method of claim 8, wherein said method further includes determining if said method requires parse information for said individual grammar by looking for ancestor symbols.

13. The method of claim 8, wherein said method further includes specifying a plurality of regular grammars within said RGDAG as starting points for a search engine.

14. The method of claim 8, wherein said method further includes returning a parse through each of a plurality of regular grammars in said RGDAG for a recognized utterance.

15. A computer automated speech recognition system, said system comprising:
    a. an input device for receiving voice signals;
    b. a means for computing said voice signals into at least one stochastic RGDAG (Regular Grammars Directed Acyclic Graph) and individual grammars;
    c. a search engine that directly processes said stochastic RGDAG;
    d. a means for adding said individual grammars within said RGDAG;
    e. a means for replacing said individual grammars within said RGDAG; and
    f. a means for deleting said individual grammars within said RGDAG.

16. The system of claim 15, wherein said system further includes a means for adding modified grammars within RGDAG.

17. The system of claim 15, wherein said system further includes a means for linking a terminal symbol from a first grammar to a start symbol in a second grammar.

18. The system of claim 15, wherein said system further includes a means for finding a maximum depth of each symbol in said RGDAG.

19. The system of claim 15, wherein said system further includes a means for determining if said system requires parse information for said individual grammars by looking for ancestor symbols.

20. The system of claim 15, wherein said system further includes a means for specifying a plurality of regular grammars within said RGDAG as starting points for said search engine.

* * * * *